AMPLITUDE RECORDING SYSTEM UTILIZING SATURABLE CORE REACTORS

Filed Jan. 29, 1952 4 Sheets-Sheet 1

INVENTOR
DAVID THEODORE NELSON WILLIAMSON
By Cushman, Darby & Cushman
ATTORNEYS

AMPLITUDE RECORDING SYSTEM UTILIZING SATURABLE CORE REACTORS

Filed Jan. 29, 1952 4 Sheets-Sheet 2

INVENTOR
DAVID THEODORE NELSON WILLIAMSON
By Cushman, Darby & Cushman
ATTORNEYS

INVENTOR
DAVID THEODORE NELSON WILLIAMSON
By Cushman, Darby & Cushman
ATTORNEYS

AMPLITUDE RECORDING SYSTEM UTILIZING SATURABLE CORE REACTORS

Filed Jan. 29, 1952 4 Sheets-Sheet 4

INVENTOR
DAVID THEODORE NELSON WILLIAMSON

By Cushman, Darby & Cushman
ATTORNEYS

United States Patent Office 2,730,694 Patented Jan. 10, 1956

2,730,694

AMPLITUDE RECORDING SYSTEM UTILIZING SATURABLE CORE REACTORS

David T. N. Williamson, Edinburgh, Scotland, assignor to Ferranti Ltd., Hollinwood, England Application January 29, 1952, Serial No. 268,785

Claims priority, application Great Britain February 2, 1951

11 Claims. (Cl. 340—172)

The invention relates to systems for the recording of intelligence and more particularly to systems for the recording of intelligence capable of being represented by or transformed into electrical signals of different amplitudes or by a waveform of the amplitude/time type.

A general object of the invention is to provide a high speed recording system which is cheap to use and which employs a minimum number of components of a permanent and robust character requiring the minimum of servicing and exchange.

A further object is to provide a recording system whose speed of recording as distinct from speed of transmitting, is not limited by the inertia of moving parts.

A particular object is to provide a graphical recording system producing a permanent visible record on a suitable medium, e. g. paper, which can be examined immediately after recording has taken place.

A further object of the invention is to provide a recording system operating on an amplitude selection basis, wherein the energy employed in the recording process is generated locally at the recording station and the received recording signals representing the intelligence to be recorded are effective only to make a selection among a plurality of recording members, whose spatial relationship to each other is arbitrarily chosen in accordance with a code or is a function of the amplitude level in the received signals.

A further object of the invention is to provide a recording system in which a plurality of individual recording members are selectively energised through a number of saturable electromagnetic inductive devices which receive each recording signal simultaneously, but of which a different one responds to each of a number of different amplitude levels.

A further object of the invention is to provide a recording system comprising a plurality of individual recording members selectively energised through a plurality of saturable electromagnetic inductive devices, whose permeability is arranged to be dependent in part on the received recording signals.

A further object of the invention is to provide a recording system wherein a plurality of saturable transductors are locally-biased to varying degrees beyond the saturation point and subjected to a common energising signal normally ineffective due to the said local bias, and recording signals of varying amplitude levels are applied in common to all of the said transductors in the sense to oppose the saturation established by the said local bias and so to completely de-saturate a selected one of the said transductors for each of a number of different amplitude levels of the recording signals and thereby to render the said energising signal effective in that selected transductor.

Particular, although by no means exclusive applications, of this invention are to the provision of a high speed type-reproducing telegraph system for example, a teleprinter, or the provision of a high speed recorder of electric or other waveforms of the amplitude/time type, or the provision of a system for the facsimile transmission and recording by reproduction of graphs, diagrams, pictures and the like, subject to certain limiting factors which will be apparent hereinafter.

Accordingly, a particular object of the invention is to provide a system for graphically recording intelligence upon an electro- or thermo-responsive material which includes an array of recording stylus members each arranged to influence at any given instant of time a different area unit of said material for causing such engaged area unit to respond visibly when the associated stylus member is appropriately energised electrically, individual selectively responsive means for each of said stylus members for providing effective electrical energisation of such member, said selectively responsive means each being responsive to an applied voltage having a value individual to said member, and means for applying recording signals of different voltages to all of said selectively responsive means.

In wave form recording the ordinate of each recording stylus in the array will be a function of the amplitude level to which it responds, but in general the co-ordinates of the styli may be chosen arbitrarily to fit a desired code. The electro- or thermo-responsive material may be arranged so as to be moved relative to the stylus members during recording, in which case such members may be arranged so that the respective area units influenced by each stylus form, at any given instant, a single row line of discrete units extending transversely to the direction of movement of the material. Such an arrangement is preferably employed when recording a waveform of the amplitude/time type, the speed of the material being then arranged to provide a time axis of the desired scale. For discontinuous or intermittent recording such material may be held stationary during recording and moved relatively to the stylus members only during the intervals between recording separate items of intelligence, in which case said stylus members may be so arranged that the respective area units influenced by each form either a single row line or a two-dimensional mosaic of discrete units.

Yet a further object of the invention is to provide apparatus for recording intelligence in the form of a series of symbols of typographical or the like kind or a graph, diagram, picture or the like which includes an array of recording stylus members having energising means selectively responsive to voltages of different amplitudes, signal-deriving means for converting the representation into electrical signals having a characteristic thereof appropriately modulated by a physical variable of the representation, means for converting the said signals into amplitude modulated signals and means for applying the amplitude modulated signals in common to all of the said stylus energising means to cause energisation of only one stylus member at a time.

When the intelligence concerned is represented by chosen ones of a series of symbols of typographical or the like kind, these are recorded by a pattern of discrete unitary areas, each corresponding to one of a range of amplitudes of the recording signals, and means are provided, preferably as part of the signal deriving means for ensuring that the recording signals corresponding to such discrete areas are applied to the stylus members in a train within the suitably short interval of time allotted for recording each complete symbol whilst the recording web is stationary, the sequence or order of the signals in such train being otherwise not critical.

Alternatively for dealing with intelligence represented by a graph, diagram, picture or the like, the signal deriving means may comprise photo-emissive surfaces assembled in a similar configuration to that of the area units associated with the corresponding stylus members, and means for causing an image of said graph, diagram, picture or the like to scan the assemblage of photo-emissive surfaces where the area units are in the form of a line, or means for projecting an image of said graph, diagram, picture or the like onto the assemblage of photo-emissive surfaces where the area units form the two-dimensional mosaic.

When recording signals of different amplitudes are transmitted to a remote recorder it may be desirable to employ a system for stabilizing the amplitudes of the received recording signals to take account of the effects of line or transmission fluctuations.

Accordingly a further object of the invention is a system for the remote graphical recording of intelligence in the form of symbols of typographical or the like kind or a graph, diagram, picture or the like, which includes means for deriving recording signals whose amplitudes are a function of the intelligence to be recorded, and for deriving control signals at a different frequency having amplitudes of known value relative to the various amplitude levels of the recording signals, means for comparing the received control signal with a locally generated reference value and means responsive to the said comparison for stabilizing the amplitude of the recording signals.

In order that the above and other objects and features of the invention may be more readily understood a number of embodiments will now be described by way of illustrative example with reference to the accompanying drawings in which.

Figure 1:
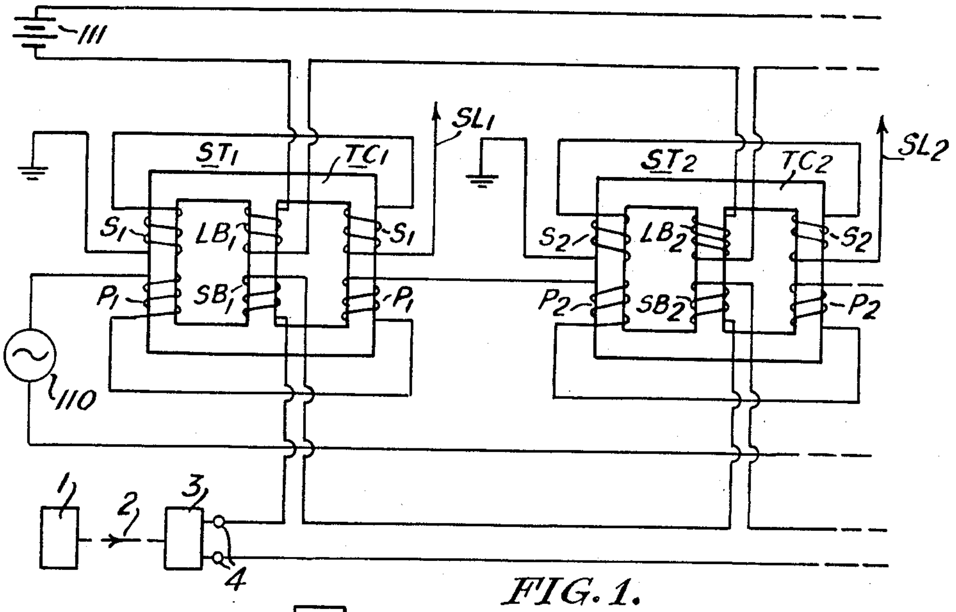
Fig. 1 is a diagrammatic view of a portion of one embodiment of a recording system according to the invention.

The system shown in Figs. 1, 2 and 3 will now be described:

1 represents a source of a voltage waveform to be recorded, this being either an original waveform or derived from some other physical variable an indication of which is desired in graphical form. 2 is a suitable link, either line or radio, over which the output is fed to a suitable amplifier 3.

Figure 2:
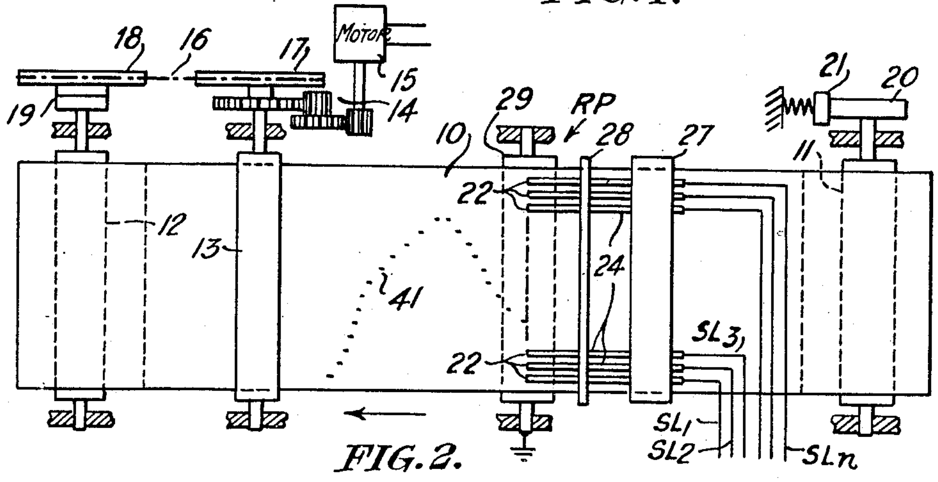
Fig. 2 is a partly diagrammatic view of one form of recording apparatus adapted to co-operate with the system shown in Fig. 1 to produce a permanent graphic record of a waveform of the amplitude/time variety.

A number of signal amplitude discriminating devices in the form of saturable transductors $ST_1$, $ST_2$ . . . are connected to the amplifier output terminals 4 and to the apparatus of Fig. 2 in the manner to be described.

Each transductor has a three-limbed core $TC_1$, $TC_2$ . . . the outer limbs of which carry the two components of a primary winding $P_1$, $P_2$ . . . all of which windings have the same number of turns. The outer limbs of each transductor also carry the two components of a secondary winding $S_1$, $S_1$ and $S_2$, $S_2$, respectively; all these secondary windings have the same number of turns, this number being usually different from that of the primary turns.

All the primary windings $P_1$, $P_2$ . . . are connected in series across a local source of A. C. supply 110 by which they are continuously energised throughout the recording process.

Each secondary winding is connected in series between earth and a different one of a line of stylus recording members 22 (Fig. 2). The respective leads to the styli are designated $SL_1$, $SL_2$. . . . The centre limb of each transductor carries a local bias winding $LB_1$, $LB_2$ . . . and a signal bias winding $SB_1$, $SB_2$ . . . by means of which the permeability of the core, or in effect the extent of its flux saturation, is controlled. The local bias windings $LB_1$, $LB_2$ . . . are all connected in series to a source of fixed D. C. bias 111. All these windings have a different number of turns so that though the same current flows through each, the magnetising force (E) due to the local bias has a different value in each transductor; each value is such as to cause the transductor concerned to be fully saturated when the corresponding signal bias winding is not energised.

Figure 3:
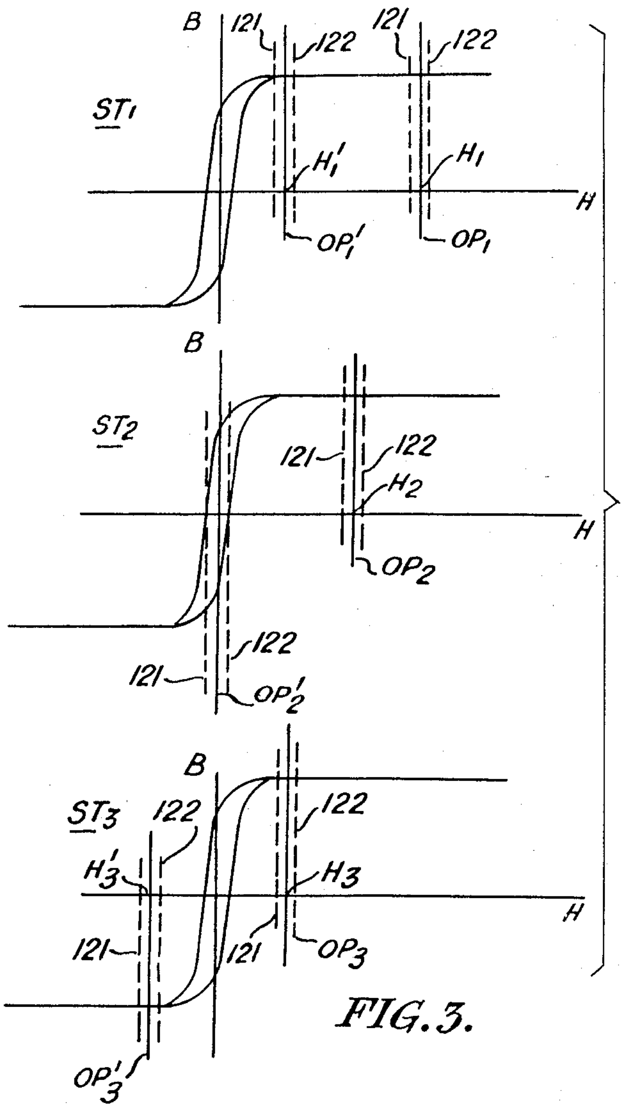
Fig. 3 shows a set of hysteresis curves illustrating the operation of the system described with reference to Fig. 1.

This is illustrated by Fig. 3 which shows the B/H curves of three of the transductors, say transductors $ST_1$, $ST_2$, and $ST_3$. The cores carrying the bias windings are made of the alloy known as "mumetal" or of an alloy having similar properties of high permeability, low hysteresis loss and low saturation level. The hysteresis loop in such case is narrow and almost vertical. The values of the respective fixed magnetising forces due to the local bias are indicated by the points $H_1$, $H_2$, $H_3$ on the appropriate H axis. In the absence of a signal on the signal bias windings, these points are the operating points of the respective transductors, as indicated by the lines $OP_1$, $OP_2$ and $OP_3$ drawn normal to the H axis through these points. In each case the broken lines 121 and 122 show the amplitude range of the A. C. magnetising force due to the respective primaries in response to energisation by the generator 110. Owing to the flatness of each curve—indicating saturation—over this range no flux variations are set up in the transductors in the absence of a signal and so no voltage is generated in the respective secondaries.

The signal bias windings $SB_1$, $SB_2$ . . . all have the same number of turns and are wound in such a sense that each of the signal magnetising forces set up by them in the manner to be shortly described oppose the local bias magnetising force ($H_1$, $H_2$ or $H_3$ in Fig. 3) set up by the respective local bias windings.

In operation, an amplified signal voltage having the waveform to be recorded appears across terminals 4 and in consequence a current proportional to this voltage flows in all the signal bias windings $SB_1$, $SB_2$ . . . setting up the same instantaneous signal magnetising force in each transductor. It is convenient to regard this signal as consisting of a number of sequential signals of different amplitude level within the limits of the amplitude range of the waveform. The circuit constants are so adjusted that for each of these sequential signals the local bias magnetising force in a different one of the transductors is exactly balanced by the opposite magnetising force due to that signal. In Fig. 3 the transductor in which the local bias magnetising force is exactly balanced by the signal magnetising force is assumed to be transductor $ST_2$. As the bias magnetising forces balance—which means that the signal bias magnetising force has the value $H_2$ in the opposite direction—the effective bias is nil and the operating point is shifted to the position $OP_2^1$ at the zero of the H axis. The amplitude range of the A. C. magnetising force is again indicated by broken lines 121 and 122. Now, however, this range operates over the steeply inclined and closed portion of the magnetisation curve with the result that pronounced variations of flux are produced. In other words the core of this transductor ceases to be saturated, the transductor is able to function as a normal transformer, the secondary becomes energised by the primary (itself energised by generator 110), and the relevant one of the stylus members 22 becomes energised.

So long as the signal has this value, all the other transductors remain saturated. The reason for this is that as the local bias magnetising forces of these transductors are all different from that of the responding transductor, on account of the different number of turns of the windings, and as the signal magnetising forces are all the same, it follows that in all these other transductors the signal magnetising force is either greater than or less than the local bias magnetising force. Where the signal magnetising force is the lesser, the existing state of saturation is merely maintained; where on the other hand the signal magnetising force is the greater, the local magnetising force is so outbalanced by the signal magnetising force that a state of saturation is set up by the signal in the opposite direction. In neither case is the transductor responsive, i. e. able to act as a normal transformer, and the associated stylus is accordingly not energized.

This is also illustrated by Fig. 3. Here in the first diagram, it is assumed that in the case of transductor $ST_1$ the signal magnetising force (again of value $H_2$) is less than the local bias magnetising force $H_1$ so that the operating point $OP_1$ is shifted to the position $OP_1{}^1$ where it cuts the H axis at a point $H_1{}^1$ such that $(H_1-H_1{}^1)=H_2$. It is clear that this operating point is still associated with an horizontal part of the magnetisation curve; accordingly the transductor remains unresponsive.

In the case of transductor $ST_3$ it is assumed that the signal magnetising force $H_2$ is greater than the local bias magnetising force $H_3$ so that the operating point $OP_3$ is shifted to the position $OP_3{}^1$ where it cuts the negative H axis at a point $H_3{}^1$ such that $(H_3-H_3{}^1)=H_2$. The resultant magnetising force $H_3{}^1$ is now in the opposite direction to the fixed bias magnetising force $H_3$, but the operating point is still associated with an horizontal part of the magnetisation curve and the transductor remains unresponsive.

It will thus be seen that for each of the sequential signals one and one only transductor is responsive, and therefore a different one of the stylus members 22 will be selected for energisation from the local A. C. source 110. It has been assumed in the foregoing description that the bias differential of the respective transductors, that is the amount of unbalance between the opposing magnetising forces in the cores are such as to give response over a range of amplitude levels in arithmetic progression. Such a choice of the circuit values is the most convenient for the recording stylus arrangement in Fig. 2, though it is not absolutely essential in every case.

The recording apparatus shown in Fig. 2, which co-operates with the recording circuits above described will now be described.

In this particular embodiment the medium for graphically recording the intelligence consists of a sheet or ribbon 10 of electro-responsive paper such as that known under the trademark "Teledeltos" which darkens or discolours on the passage of an electric current through it. This paper ribbon 10 is passed from one reel 11 to a second reel 12 by a feed arrangement of two parallel feed rollers 13 disposed transversely of the ribbon and providing therebetween a pressure nip through which the ribbon passes. The feed rollers 13 are driven at a suitable constant speed through gearing 14 by an electric motor 15. A suitable arrangement, such as a belt or chain drive 16 between a pulley 17 on the spindle of the lower roller 13 and another pulley 18 on the spindle of the reel 12, is provided for rewinding the ribbon 10 on to the reel 12. A friction clutch 19 is associated with the pulley 18 to prevent excess rewinding tension. The opposite reel 11 may be provided with a friction brake drum 20 and a spring urged braking block 21 to maintain the ribbon 10 in an appropriately taut condition.

Figure 5:
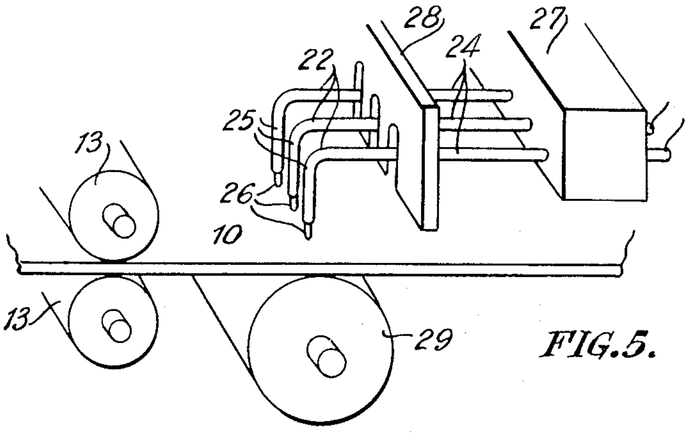
Fig. 5 is a fragmentary perspective view of a part of the recording apparatus shown in Fig. 1.

Between the reels 11 and 12 the ribbon 10 passes a recording position RP constituted by the row of equally spaced styli 22. As shown more clearly in Fig. 5 each stylus 22 consists of an electrical conductor 24 having a downwardly bent end 25 which is provided at its lower extremity with a platinum or tungsten tip 26. Towards their opposite ends each of the stylus conductors 24 is rigidly secured in an insulated holder bar 27 while a comb 28 of insulating material located parallel to the holder bar 27 but nearer to their ends 25, serves accurately to locate the ends of the conductors so that at any given instant each tip 26 engages an individual area unit of the paper ribbon 10 by lightly pressing the latter against the surface of a co-operating conductor located on the opposite, i. e. under, side of the paper. The co-operating conductors for each of the styli are conveniently combined as a single electrically conductive and rotatable roller 29 connected to earth; they may however be combined to form a stationary conductive plate, or even left uncombined, e. g. in the form of a conductive plate or roller individual to each stylus. The combination of each stylus and the co-operating conductor on the other side of the paper constitutes what will herein be termed a "stylus member."

At any given instant the area units lying in the immediate vicinity of each tip 26 form a line of discrete area units extending transversely to the direction of movement of the paper. Electrical energisation of any stylus member by the application of the energising A. C. voltage from the secondary winding $S_1$, $S_2$ . . . of the associated transductor, through the lead $SL_1$, $SL_2$ . . . the stylus 22 and its co-operating conductor 29 to earth results in the passage of a current through the engaged area unit of the paper which in turn causes it immediately to be activated so as to respond visibly and, preferably, permanently by darkening or otherwise changing colour. Each stylus is connected to that transductor whose amplitude response level in the series corresponds with i. e. is a function of the ordinate of position of that stylus with respect to the time axis of the movement of the paper.

In the operation of the above described arrangement the motor 15 is set into operation so as to move the paper strip 10 steadily past the recording position RP of the line of styli 22 the tips 26 of which remain in light contact with the paper to press it against the co-operating roller 29. The recording circuits respond sequentially to the signals to cause effective energisation of the associated stylus members. For example, it may be arranged that the input voltage at its zero amplitude value would produce response of transductor $ST_1$ only and would cause effective energisation only of the lowermost stylus member at the recording position. Similarly, the voltage waveform at its maximum amplitude level would produce response of say transductor $ST_n$ associated with the uppermost stylus member of the group and cause effective energisation only of that member. Similarly, for intermediate amplitude levels stylus members at corresponding intermediate positions would be energised. Consequently, as the input voltage waveform varies so the location with respect to the time axis of travel of the paper of each successively responding stylus member similarly varies to provide a reproduced image as shown at 41 in Fig. 2.

The waveform is thus recorded cheaply and accurately and the record is available for examination immediately after its production if required. Furthermore, the speed of recording is not limited by the inertia of mechanically moving parts since the only mechanical movement is that of the paper 10 which takes place, in this embodiment, at a steady speed.

Where the waveform or equivalent variation with time which is to be recorded is not itself a voltage as assumed above, any suitable means may be utilised for converting such variation with time into a variable voltage. Furthermore, for improved transmission over the link 40, frequency modulation may be employed, the received signals undergoing frequency to amplitude conversion before arriving at the amplifier 3.

The arrangements described above admit of various modifications that will readily become apparent. For example, the styli need not be equally spaced across the paper and the amplitude levels to which the transductors respond need not necessarily form an arithmetic series. If, however, the waveform is to be recorded without distortion there must clearly be a consistent relationship between these factors, any irregularity in the spacing of the styli being compensated for by a similar irregularity in the spacing of the associated amplitude levels. This is, of course, assuming that the output of the amplifier 3 accurately follows the amplitude variations of the source 1 or the variations in the quantity from which the source signals are derived. Should there be any constant distortion in this respect it may be corrected by a corresponding irregularity of either the physical spacing of the styli or of the spacing of the amplitude levels of the responding transductors.

Where it is desired to record the zero axis of the waveform a second D. C. bias may be superposed on the output of amplifier 3 such that in the absence of an actual signal the so-called signal bias due to this D. C. bias just balances the local bias magnetising force of the transductor associated with the stylus the energisation of which is required to record the zero axis on the moving paper. In the presence of signals the voltage across output terminals 4 is the algebraic sum of this second D. C. bias and the sequential signals. By varying this D. C. bias the level of the zero axis may be altered at will. Where amplifier 3 is a D. C. amplifier the D. C. component that is normally present in the absence of a signal may be used for this bias.

Where it is desired to record the zero axis without the use of the second D. C. bias above referred to—for example where the amplifier 3 is an A. C. amplifier—the zero axis may be recorded by arranging that the transductor associated with the relevant stylus member has no local bias applied to it so that this transductor is responsive to signals of nearly zero value. It is then necessary to wind in opposite senses either the local bias or the signal bias coils of the transductors associated with the stylus members respectively above and below the zero axis.

Figure 8:
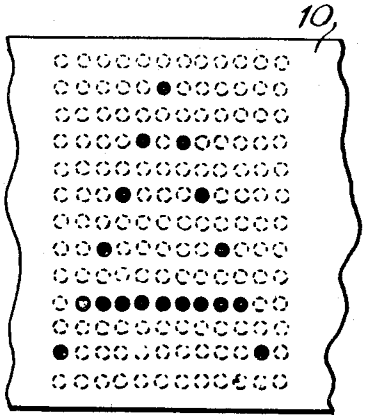
Fig. 8 is a sketch illustrating the field area dealt with at each operation of the system of Figs. 6 and 7 and showing the manner of reproducing the intelligence.
Figure 7:
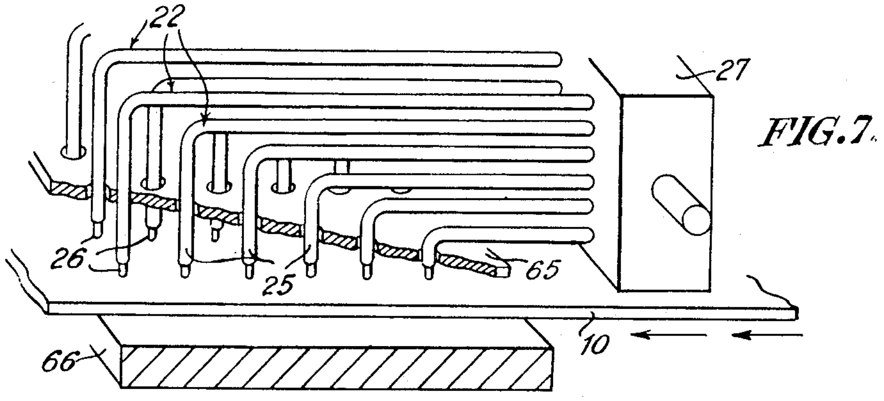
Fig. 7 is a fragmentary perspective view similar to that of Fig. 5 showing the recording apparatus employed in the system according to Fig. 6.
Figure 6:
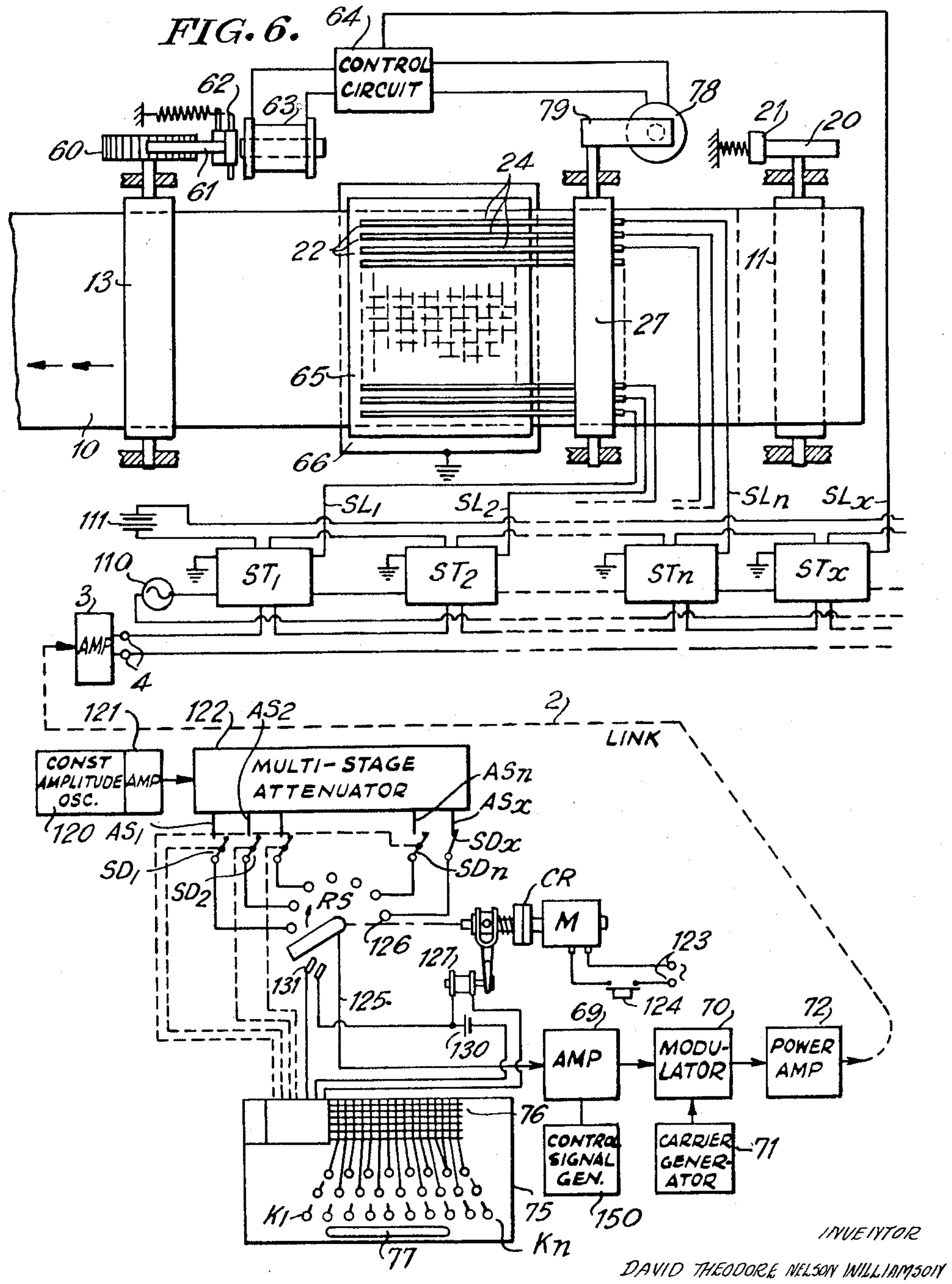
Fig. 6 is a partly diagrammatic view similar to that in Fig. 2 illustrating a high speed teleprinter system embodying the invention.

Another embodiment of the invention is shown in Figs. 6, 7 and 8 in the form of a high-speed type-reproducing telegraph system, for example a teleprinter. The intelligence transmitted and recorded in this example is composed of separate items each covering a two-dimensional field area such as a letter of the alphabet, a numeral, an algebraic or other symbol, or the like, for each of which the term "symbol" will hereinafter be used. In this embodiment the styli 22 are arranged, as shown more clearly in Figs. 7 and 8, so that the individual area units of the recording material beneath them at any given instant form a rectangular mosaic rather than a straight line, the required two-dimensional image being marked by energization of selected ones of the stylus members sequentially within an intermittently recurring recording period during which the recording material is held stationary. The various stylus conductors 24 are arranged in banks dealing respectively with successive vertical columns of the mosaic area, all of the conductors being held in separately insulated manner in the holder bar 27 and connected as before one to each of one of the selectively responsive means comprised by the saturable transductors $ST_1$, $ST_2$, . . . . For convenience the respective amplitude response levels of the various stylus members are arranged as an arithmetic series, subdivided into groups each dealing with a separate vertical column of the mosaic. This is not essential however and in some circumstances, e. g. for the purpose of secrecy of transmission, the respective response levels may be selected according to a prearranged code. The comb 28 of the first embodiment of Fig. 2 is replaced in this instance by a perforated locating plate 65. The cooperating conductors are conveniently combined in this instance in the form of a flat metal plate 66 connected to earth.

As shown in Fig. 6 the recording material is again a paper ribbon 10 fed from a reel 11 intermittently by an amount at least equal to and preferably slightly greater than the corresponding width dimension of the mosaic area of the stylus members. This intermittent feed is shown as effected by feed rollers 13 which are intermittently rotated through ratchet-wheel 60 by pawl 61 on oscillating armature 62 operated by electro-magnet 63 energised at intervals by control circuit 64.

In this system any suitable form of signal deriving and coding means may be employed to translate each separate symbol into a train of the different amplitude levels necessary for its recording by the styli.

As shown schematically in the drawing the signal-deriving means of this embodiment takes the form of a suitable constant amplitude oscillator 120, whose output is amplified in an amplifier 121 and fed to a multi-stage attenuator 122, which divides the input signal into an arithmetic series of amplitudes of the same frequency, the output stages being indicated generally by $AS_1$, $AS_2$ . . . $AS_n$, each controlled by a normally open switch $SD_1$, $SD_2$ . . . $SD_n$ connected to the fixed contacts of a rotary switch RS, the moving element of which is driven by a motor M through a suitable one-revolution clutch CR, which is shown in conventional manner as engageable by means of a fork shift lever, normally spring-urged to the "off" position by a spring and operated by a relay 127. The motor is driven from a source 123 through a starter switch 124 and the clutch is electrically controlled by the key-return mechanism of the keyboard 75 through the relay 127. The clutch may, however, also be under the control of the spacing bar 77 of the typewriter keyboard 75 if spacing of the ribbon 10 is required between groups of symbols.

The control or coding of the switching devices $SD_1$, $SD_2$ . . . $SD_n$ may be effected simultaneously by the operation of a single control such as a selected one of the character keys $K_1$ . . . $K_n$ of the typewriter keyboard 75, which selects and operates the required combination of switches identified with that character through selector mechanism indicated schematically at 76 and resembling in construction that commonly employed and known in teleprinter keyboards and tape-perforators.

The common output lead 125 from the sequence rotary switch RS may be connected directly by way of link 2 to the amplifier 3 feeding the transductors $ST_1$, $ST_2$ . . . . When, as will usually be the case with this embodiment, transmission to a distant point is required, then the output is conveniently connected through an amplifier 69 to a modulator circuit 70 also supplied by a carrier-wave oscillation generator 71. The output from the modulator 70 is amplified in power amplifier 72 and then fed over link 2 to the recorder. The link 2 may be either a direct cable or a radio link. It will be understood that the amplifier 3 will, in this case, also contain suitable demodulating equipment.

In this arrangement the selection of the desired pattern of data within the rectangular mosaic formed by the tips of the styli 22 is initiated by depression of the selected typewriter key, this either simultaneously or sequentially closing, through the coding mechanism 76, those switches $SD_1$ . . . $SD_n$ of the attenuator stages $AS_1$, $AS_2$ . . . $AS_n$ corresponding to the stylus members relevant to that pattern. Immediately thereafter the type-bar key-return mechanism operates to momentarily energise the relay 127 through battery 130 to close the clutch CR, whereby switch RS operates and thereby transmits the selected amplitude levels sequentially over lead 125 and link 2. Once the clutch CR is engaged it remains so until it disengages automatically, in the known manner, after performing one revolution, during which the contact arm of switch RS performs one complete scan of the fixed contacts. Fig. 8 shows the letter "A" thus reproduced. These signals, each representing one stylus and one dot, are thus applied to all the transductor recording circuits, but only those transductors which are responsive to the amplitudes of the signals respond. In consequence only the stylus members associated with these circuits become effectively energised, these stylus members being those whose energisation is required to reproduce that symbol. The actual recording may thus be effected at a high speed, since no mechanical moving parts are concerned in it.

In order to actuate the mechanism such as the control circuit 64 and magnet 63 as shown whereby the paper ribbon 10 is shifted after each symbol has been recorded so as to provide a fresh area of paper under the styli 22 a synchronising signal may be transmitted between the signals representing each symbol. This signal may comprise a pulse at yet a further amplitude and is, in the example shown, provided by the additional attenuator stage $AS_x$ connected through an additional, but normally closed switch $SD_x$ to a final contact 126 on the switch RS. The space pulse is thereby transmitted at the end of each character sequence. An additional transductor $ST_x$ is arranged to respond to the space pulse and provides an output which actuates the control circuit 64 which may be a trigger circuit. The space signal may also be arranged to cause lifting of the styli 22 off the paper during the shifting movement to prevent frictional wear on the paper or on the styli, by arranging the holder bar 27 so as to be rockable by an electro-magnet 78 operating through an armature 79 secured to the bar 27. The selected code switches $SD_1$ . . . $SD_n$ are cleared at the end of each character sequence, and before the next sequence is transmitted, by means of a reset circuti operated through reset contacts 131, operated by the arm of the rotary switch RS at the end of each transmitted sequence, and controlling the resetting of the switches through the selector mechanism 76. The clutch control relay 127 may also be arranged to be operated by the space bar 77 at the end of each group of characters, so that the ribbon 10 is automatically shifted to provide the desired spacing of the recorded groups.

In further embodiments of the invention the signal-deriving means of the recording system may be modified for use as a facsimile reproducer. In several forms of these the equipment is similar to that described above in connection with the type-reproducing telegraph system of Figs. 6, 7 and 8, except that the switching devices $SD_1$, $SD_2$ . . . $SD_n$ associated severally with the amplitude determining circuits $AS_1$, $AS_2$ . . . $AS_n$ now take the form of electronic switches of the photo-emissive type, for example photo-electric cells, assembled in a corresponding configuration to that of the stylus members 22, i. e. in line of mosaic, and in each case an optical arrangement is employed for causing the light image of the graph, diagram, picture or other intelligence to scan or to be projected onto the assembly of photo-cells. Each illuminated cell acts in effect as the corresponding switch $SD_1$, $SD_2$ . . . $SD_n$ acted in the foregoing embodiment, allowing the output of the associated attenuator stage $AS_1$, $AS_2$ . . . $AS_n$ to pass to the recorder (either direct or after translation into another form) to cause energisation of the stylus member 22 occupying the same relative position in the assembly of stylus members as that photo-cell occupies in the assembly of photo-cells. Reproduction of the light image is thus effected within limits depending largely on the number of styli or photo-cells in the assembly.

Figure 9:
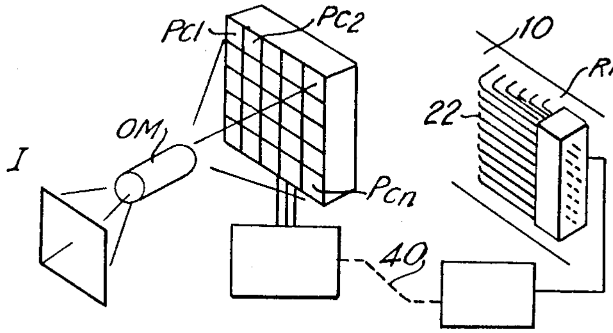
Figs. 9 and 10 are perspective schematic views showing signal deriving arrangements which may be employed for facsimile recording and reproduction.

Fig. 9 shows schematically one arrangement using a mosaic assembly of cells and styli and in which a still image of the intelligence I is caused to fall by optical means OM upon a mosaic assembly of photo-cells $P_{c1}$ . . . $P_{cn}$. The paper 10 under the recording styli 22 remains stationary during each recording operation, and suitable means are provided for sequentially transmitting pulses corresponding to the outputs of the photo-cells.

Figure 10:
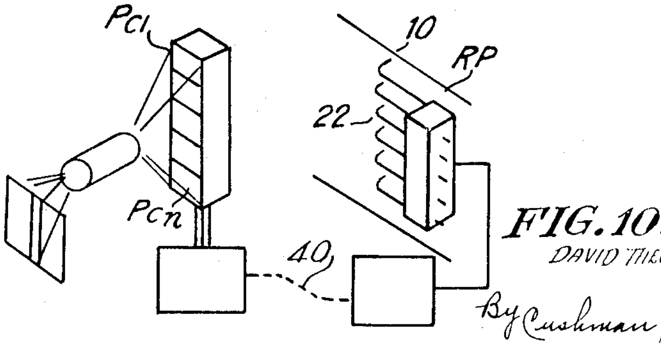

In an alternative arrangement as shown in Fig. 10 using a line assembly of photo-cells and styli the image may be caused to scan the single line $P_{c1}$ . . . $P_{cn}$ of photo-cells in a direction transverse to the line. The image is scanned across the line of photo-cells $P_{c1}$ . . . $P_{cn}$ in a series of intermittent movements—the paper 10 moving similarly past the line of styli 22—and each time the image is stationary the strip of it that falls on the cells is, as it were, scanned in an amplitude sense to transmit sequential signals corresponding to the photo-cell outputs. The output of only those circuits whose cells are illuminated are transmitted over the link 2 to the recording apparatus.

It will be appreciated that with this arrangement each item of intelligence is in effect divided up into a number of successive strip-like component parts, each part being recorded whilst the paper is stationary.

Other scanning arrangements, such as will readily occur to those versed in television systems, may alternatively be employed.

The intelligence recorded in this facsimile manner may of course be in the form of the symbols already referred to, the equipment being then in effect a teleprinter or the like. The image of the symbol may be caused to scan a line of photo-cells or be projected onto a mosaic of them or be otherwise coded into the appropriate signals by photo-electric agency.

Figure 4:
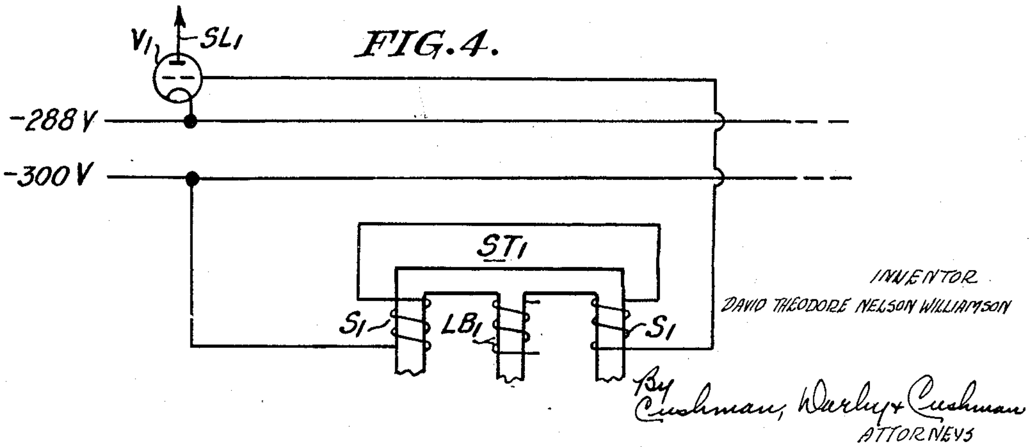
Fig. 4 is a diagram showing a part of modification of the system of Fig. 1.

In any one of the embodiments above described, where it is desired to energise the stylus members by a D. C. rather than an A. C. voltage, for example where the recording medium responds to electrolytic action, or where it is desired to use miniature transductors incapable of transmitting much power, the secondary circuit of each transductor may be modified as shown in Fig. 4.

One end of each secondary winding $S_1$, $S_2$ . . . is connected to one pole of a source of negative bias supply having a potential of about −300 volts, and the other end is connected to the grid of a triode valve $V_1$, $V_2$ . . . the cathode of which is connected to the other pole of the supply, this pole having a potential of about −288 volts. The leads $SL_1$, $SL_2$ . . . to the respective stylus members are connected to the anodes of the valves $V_1$, $V_2$. . . . Each anode circuit is completed through the stylus, the paper, and roller 29 to earth, so that each anode is at a positive potential with respect to its cathode of 288 volts.

With this arrangement, when a transductor is not responding and in consequence its secondary is unenergised the grid of the valve is negatively biased with respect to the cathode to the extent of about 12 volts, which is sufficient to ensure anode current cut-off. When the transductor is responsive, the grid potential is raised during each positive half cycle of the secondary output for the valve to conduct during part of each half cycle, with the result that the corresponding stylus member is energised by a pulsating direct current and a mark is made on the paper as before.

Where recording signals of various amplitudes are derived and transmitted over a line or other link to the recording apparatus, it may be desirable to incorporate in the system some form of amplitude stabilizing means to counteract the known effects of line or other transmission fluctuations.

Figure 11:
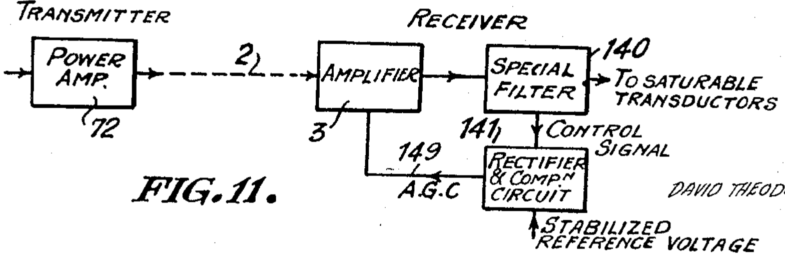
Fig. 11 is a schematic diagram illustrating an amplitude stabilization system for received recording signals.

An amplitude stabilizing system suitable for use in the graphical recording systems above described is schematically illustrated in Fig. 11 of the drawings. The stabilizing system is here illustrated as applied to the remote recording system of Fig. 6, though it will be readily understood that it may also be applied to the other recording systems above described.

72 represents the power amplifier at the transmitter, whose output is applied over the line or radio link 2 to the receiving amplifier 3. The stabilizing system comprises a special filter 140 interposed between the receiving amplifier 3 and the saturable transductors $ST_1$, $ST_2$, etc., of the recording apparatus, and a rectifier and comparison circuit 141 connected to receive a filtered control signal from the filter 140, as will be further described, having an A. G. C connection to the amplifier 3.

Figure 12:
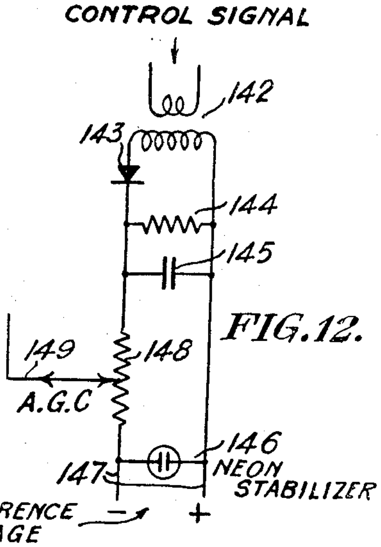
Fig. 12 is a circuit diagram of a rectifier and comparison circuit employed in the system of Fig. 11.

Fig. 12 shows the circuit diagram of the rectifier and comparison circuit 141 of Fig. 11. This comprises on the signal input side, a rectifying circuit including the transformer 142, rectifier 143, condenser 145 and resistance 144. At the other side of the circuit a locally generated D. C. reference voltage is applied to the terminals 147, across which is connected the neon stabilizing tube 146, the latter being connected through a regulating resistance 148 to the side of the rectifying circuit of the like polarity. An automatic gain control connection taken from a suitable point on the regulating resistance 148 to the main receiving amplifier 3.

In operation, a control signal, of known constant amplitude relative to the various amplitudes of the derived recording signals, is transmitted with these signals but at a different frequency by means of the control signal generator 150 (Fig. 6). After amplification in the receiving amplifier 3, the control signal is filtered by the special filter 140, which is adapted to separate the control signal from the recording signals, and fed to the rectifier and comparison circuit. The recording signals are passed on to the saturable transductors of the recording apparatus. The control signal is transformed and rectified, and the rectified voltage is applied through the regulating resistance 148 to the stabilizer tube. The A. G. C connection 149 is adjusted to give the desired relation between the control signal voltage and the reference voltage for signal reception. Variation of the rectified control signal voltage with respect to the stabilized reference voltage will vary the potential across the regulating resistance 148 and hence the derived A. G. C voltage. The A. G. C voltage thus applied to the amplifier will tend to correct any unbalance between the control voltage and reference voltage and therefore to stabilize the amplifier output.

Further modifications applicable to the above described embodiments will now be briefly indicated.

The local bias windings may all have the same number of turns; in which case the local bias voltage should be different for each transductor, or the number of turns of the signal bias windings may all be different, or some other means may be adopted to ensure that only the relevant transductor is rendered responsive to each signal.

The primary voltage derived from generator 110 need not be constant in amplitude but may with advantage be varied in accordance with the rate of change of the signal voltage so as to preserve uniform intensity of the visible record, irrespective of the recording speed.

In the case of the system described with reference to Figs. 1 to 4, several waveforms may be simultaneously recorded provided that the corresponding signal voltages are applied in sequence for brief instants on a time-sharing basis.

The electro- or thermo-responsive paper may be in sheet form and its necessary movements in perpendicular directions effected as in a teleprinter. The paper may be caused to respond by radio frequency heating rather than by the passage of current through it; each stylus then becomes an electrode with the co-operating conductor forming the other electrode. An advantage of this arrangement is that the styli need not touch the paper, which relieves the paper and the styli from wear when the paper is moved relative to the styli during the actual recording process or obviates the necessity for lifting the styli off the paper when it is moved only between the recording of separate items. The paper itself may be such as responds by electrolytic action when a current is passed through it. The circuits of the selectively responsive means need not cause energisation of the associated stylus members direct but may allow them to be energised by some intermediate agency such as relays. The co-operating conductors may be joined together in other forms than those of a roller or plate, or may be separate for each stylus. The stylus may be tipped with other substances than platinum or tungsten that are not readily burned or corroded.

I claim:

1. A system for the visible recording of intelligence capable of being translated into electrical signals of varying amplitude, comprising a sheet of electro-responsive material, an array of stylus members each arranged in proximity to a different unit area of the sheet and each identified with a different level of amplitude of said signals, and an amplitude discrimination system for selectively energising said stylus members comprising a plurality of saturable transductors, one for each of said stylus members, means for locally biasing each of said transductors beyond the magnetic saturation point to different degrees proportional to the different amplitude levels of the signals to be recorded comprising a local bias winding on each transductor, all of said local bias windings being energised by a substantially constant source of direct current, a primary winding for each transductor energised by a substantially constant source of alternating current, a secondary winding for each transductor connected in energy transfer relation to an individual one of said stylus members, the alternating fluxes due to said primary winding and said secondary winding being individually balanced with respect to the bias windings so as to have no coupling effect on the said bias windings, and means for applying electrical signals of varying amplitude representative of the intelligence to be recorded to all of said signal bias windings in common.

2. A system as claimed in claim 1 wherein the local bias windings of all the transductors have different numbers of turns whilst the signal bias windings all have equal numbers of turns.

3. A system as claimed in claim 1 wherein the local bias windings of the individual transductors each have the same numbers of turns, and the respective signal bias windings of the individual transductors have different numbers of turns.

4. A system as claimed in claim 1, wherein the recording members are arranged to be responsive to D. C. voltages, and a rectifying circuit is connected between the secondary winding of each respective transductor and the corresponding recording member.

5. A system for graphically recording intelligence comprising means for deriving sequential signals whose amplitude represents a variable characteristic of the intelligence, a sheet of electro-responsive material, an array of recording stylus members each adapted to influence a different unit area of said sheet, and an amplitude discrimination system for selectively energising said stylus members comprising for each stylus a saturable transductor, means for obtaining different degrees of magnetic saturation of said respective transductors comprising a core on each transductor having a local bias winding supplied by a common source of direct current, and a signal bias winding differentially wound in relation to the local bias winding, each transductor also having a primary winding energised by a substantially constant source of alternating current and a secondary alternating current winding connected in energy transfer relation to one of said stylus members, said primary winding and said secondary winding being arranged to have no inductive coupling effect on the local bias windings and the signal bias windings, and means for applying said variable amplitude signals to all of said signal bias windings in common to obtain sequential desaturation of individual transductors and energisation of the stylus members corresponding to the said desaturated transductors.

6. The system according to claim 5 comprising means for transmitting amplitude modulated signals and means for stabilizing the amplitudes of the received recording signals comprising means for transmitting with said recording signals a control signal of constant amplitude with respect to the recording signals and of different frequency, an amplifier for the received recording signals, means for separating the received control signal and recording signals, means for deriving a D. C. voltage from the control signal, means for comparing the said derived voltage with a stabilized reference voltage and means dependent upon said comparison for stabilizing the output of the said receiving amplifier.

7. The system according to claim 5 comprising means for transmitting amplitude modulated signals and means for transmitting with said signals a control signal of different frequency and constant amplitude, an amplifier for the received recording and control signals, means for deriving a D. C. voltage from the said amplified control signal, means for comparing the said D. C. voltage with a reference voltage and means for deriving from the said comparison an A. G. C voltage to stabilize the amplifier output.

8. A recording system for the graphical recording of an amplitude modulated waveform comprising a line of electrically energisable recording stylus members, a sheet of recording material driven to move with respect to said recording members at a speed proportional to the time base of the waveform, a saturable transductor for energising each one of said recording members independently, a local bias winding on each of said transductors, a signal bias winding adapted to establish a magnetising force in opposition to that set up by the local bias winding, said local bias windings and signal bias windings being dimensioned such that normally said tranductors are saturated to varying degrees corresponding to different amplitudes of the waveform and that for each amplitude level of the applied recording signals the said opposing magnetic forces are exactly counterbalanced in only one of the said transductors, a primary energising winding for each transductor energised by a common source of alternating current and a secondary winding inductively linked with the said primary winding and connected in energy transfer relation to the respective stylus recording member, said primary winding and said secondary winding each being individually balanced with respect to the said bias windings so as to have no inductive coupling effect on either of said bias windings whatever the state of the core, the said secondary winding being effectively energised only when the opposing magnetic fluxes due to the local and signal bias windings are balanced to desaturate the transductor.

9. A recording system according to claim 8 for recording also the zero axis of the waveform comprising also an amplifier for applying the recording signals to the transductors and means for superposing a D. C. bias on the output of the said amplifier, the action of the said D. C. bias being arranged to counterbalance the local bias magnetising force of that one of the said transductors associated with a recording member which is designed to record the zero axis on the moving web of recording material.

10. A recording system in accordance with claim 8, wherein the amplifier supplying the recording signals to the transductors is a D. C. amplifier whose normal D. C. component is employed as the D. C. bias which is superimposed on the signal bias windings of the transductors to record the zero axis of the waveform.

11. A recording system in accordance with claim 8, wherein the amplifier from which the recording signals are supplied to the transductors is an A. C. amplifier, and that one of the transductors associated with the recording member which is to record the zero axis of the waveform has no local bias and is responsive to a signal of minimum amplitude, and the respective bias windings of the transductors associated with the individual recording members situated above and below the zero axis respectively are arranged to act in the appropriate senses to effect recording above and below the zero axis.

References Cited in the file of this patent

UNITED STATES PATENTS

| | | |
|---|---|---|
| 1,150,272 | Kinsley | Aug. 17, 1915 |
| 1,283,147 | Ghio | Oct. 29, 1918 |
| 1,514,753 | Wold | Nov. 11, 1924 |
| 1,708,737 | Pearne | Apr. 9, 1929 |
| 1,819,599 | Francis | Aug. 18, 1931 |
| 2,021,099 | Fitzgerald | Nov. 12, 1935 |
| 2,129,920 | Fitzgerald | Sept. 13, 1938 |
| 2,244,257 | Maul | June 3, 1941 |
| 2,519,513 | Thompson | Aug. 22, 1950 |
| 2,637,018 | Hertog | Apr. 28, 1953 |
| 2,639,209 | Gamarekian | May 19, 1953 |